United States Patent [19]

Lovatt

[11] Patent Number: 4,640,517
[45] Date of Patent: Feb. 3, 1987

[54] COLLET CHUCK

[76] Inventor: John Lovatt, West View, Rock Cross Nr Kidderminster DY14 9SF, England

[21] Appl. No.: 581,361

[22] Filed: Feb. 17, 1984

[30] Foreign Application Priority Data

Mar. 16, 1983 [GB] United Kingdom ............... 8307185

[51] Int. Cl.$^4$ .............................................. B23B 31/20
[52] U.S. Cl. .................................. 279/2 R; 279/56; 279/14
[58] Field of Search ................... 279/2 R, 55, 56, 58, 279/59, 1 B, 1 DA, 14

[56] References Cited

U.S. PATENT DOCUMENTS

| | | | |
|---|---|---|---|
| 2,628,827 | 5/1954 | Cawi | 279/56 X |
| 2,631,860 | 3/1953 | Bronson | 279/56 |
| 3,905,609 | 9/1975 | Sussman | 279/56 X |

FOREIGN PATENT DOCUMENTS

| | | | |
|---|---|---|---|
| 326105 | 9/1920 | Fed. Rep. of Germany | 279/2 R |
| 2311432 | 9/1974 | Fed. Rep. of Germany | 279/2 R |
| 759856 | 10/1956 | United Kingdom | 279/2 R |

Primary Examiner—Z. R. Bilinsky

[57] ABSTRACT

A collet chuck has separable jaws which are freely slidable in a housing and have inner and outer faces engageable by inner and outer sleeves respectively, to urge the work-engaging ends of the jaws radially outwardly or radially inwardly. The jaws are readily replaceable by others of different effective gripping diameters, without the need for replacement of other chuck parts. The inner sleeve and a thrust element for moving the jaws relative to the inner sleeve are added to the assembly only when outward movement of the jaws is required.

7 Claims, 4 Drawing Figures

COLLET CHUCK

This invention relates to collet-type chucks for machine tools.

It is known to provide a collet chuck for a machine tool, the chuck comprising an element formed with a plurality of jaws which have tapered outer faces engageable by a sleeve, such that relative axial movement between the sleeve and the jaws causes the latter to be urged radially inwardly to grip the outer surface of a workpiece. It is a disadvantage of such known chucks that the amount of radial jaw movement obtainable from a particular chuck element is relatively small, being limited by the capacity of the jaws to flex relative to the remainder of the element.

It is a further disadvantage that replacement of the chuck element to accommodate workpieces of larger or smaller diameters also requires replacement of the sleeve, since a larger diameter chuck element cannot be passed through a sleeve which is designed to operate with an element of smaller diameter. It is an object of the invention to provide a collet chuck in which the foregoing disadvantages are overcome.

It is a further disadvantage of known collet chucks that their jaws cannot readily be adapted to move radially outwards so as to grip the inside surface of a workpiece. It is a further object of the present invention to provide a collet chuck in which the same jaws may be used for gripping either the inside or outside surfaces of a workpiece.

According to the invention there is provided a collet chuck comprising a body provided with means for securing to a machine tool shaft so that the axis of the body is aligned with that of said shaft, a plurality of jaws mounted in said body and being substantially equally spaced about the axis thereof, said jaws being separate arcuate elements which are freely slidable within said body and are engageable with an abutment therein, a removable ring retaining said jaws in their relative positions in said body, an outer sleeve surrounding said jaws and being axially movable relative thereto, said sleeve being engageable with outer faces of said jaws the latter radially inwardly.

In a preferred embodiment there is provided an inner sleeve engageable with concave faces of said jaws, and a part engageable between said outer sleeve and said jaws for moving the latter axially so that engagement between said inner faces and said inner sleeve urges said jaws radially outwardly.

An embodiment of the invention will now be described by way of example only and with reference to the accompanying drawings in which.

Figure 1:
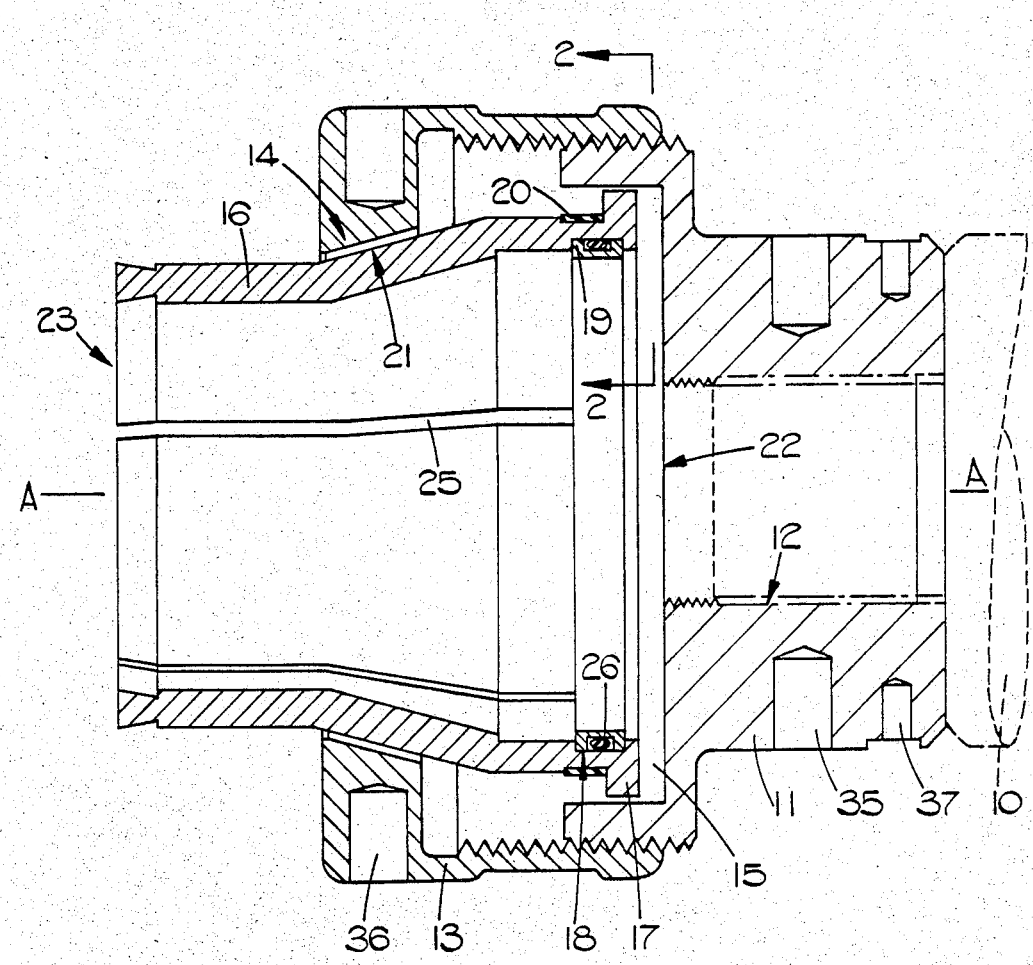
FIG. 1 is a longitudinal section through a collet type chuck.

The collet chuck shown is intended for attachment to the shaft 10 of a machine tool and includes a body 11 having a threaded bore 12 for engagement with a threaded end of the shaft 10. The body 11 is of circular section and its axis A—A is aligned with that of the shaft 10 by means of the bore 12. An internally threaded sleeve 13 engages a complementary thread on the body 11 so that the sleeve 13 may be moved axially of the body 11. The sleeve 13 has an internal frusto-conical surface 14 whose larger end is the closer to the threaded engagement with the body 11. Located within a recess 15 in the body 11 are four identical and separate jaw elements 16. Flanges 17 on the elements 16 are slidable with clearance in a cylindrical surface of the recess 15. Adjacent the flanges 11 the elements 16 are provided with projections 24 which maintain circumferential spacing 25 between the elements 16. Adjacent the flanges 17 the radially inner surfaces of the elements 16 have circumferential grooves 18 in which a rigid ring 19 is engaged. The ring 19 itself has an external circumferential recess in which is located an elastomeric toroidal ring 26 which engages the bottoms of the grooves 18. A spring ring 20, which is conveniently in the form of an elastomeric band, engages the outer surfaces of the elements 16 to maintain them in position on the ring 16 during assembly and before insertion of the flanges 17 into the recess 15.

The elements 16 have outer faces 21 which lie on a conical surface whose included angle is equal to that of the surface 14. The sleeve 13 is movable rightwardly, as viewed in FIGS. 1 and 3, by rotation relative to the body 10, urging the flanges 17 into abutment with the bottom 22 of the recess 15, and thereafter urging the work-engaging ends 23 of the elements 16 radially inwardly as a result of engagement between the surface 14 and the faces 21.

Figure 4:
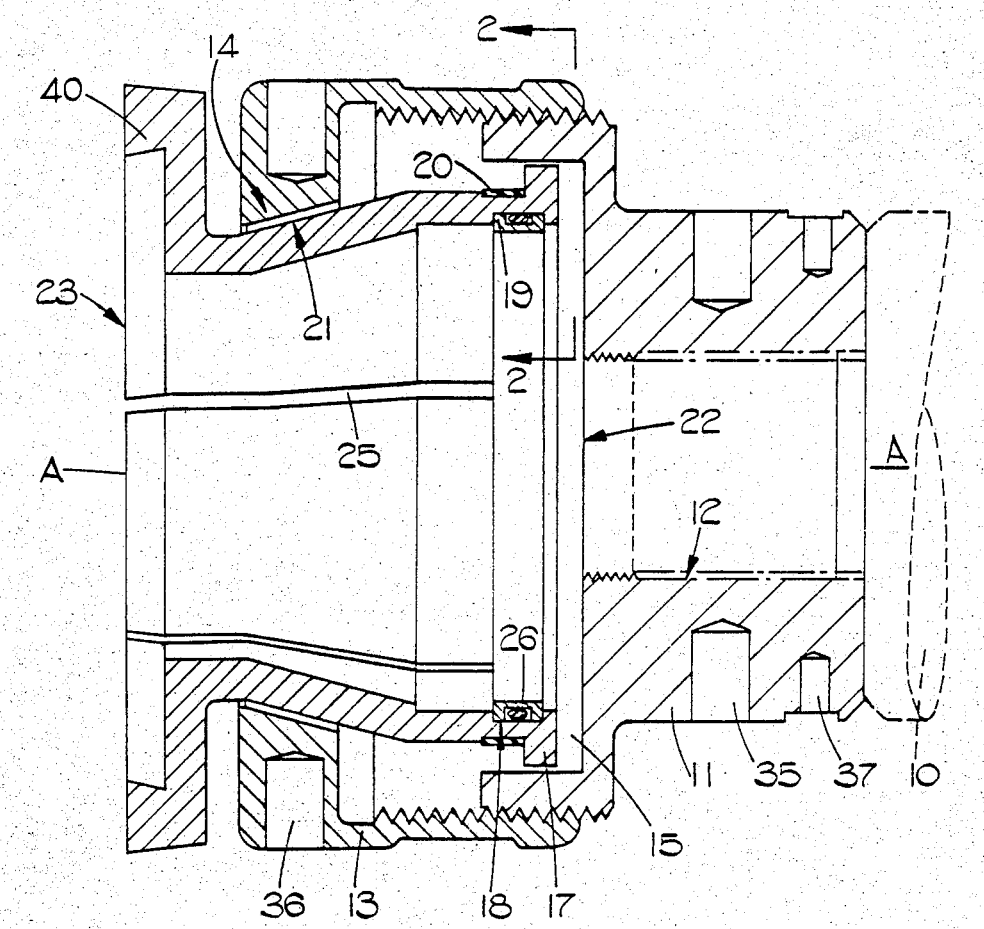
FIG. 4 is a section corresponding to FIG. 1 and showing jaws having enlarged work-engaging ends.

The provision of four separate elements 16 has the effect that the collet may readily be dismantled by unscrewing the sleeve 13 and removing the ring 20, whereupon the elements 16 may be separated. This feature enables the elements 16 to be replaced by others of different sizes, and in particular of sizes in which the work-engaging ends 23 form a diameter which is larger than the smallest opening in the sleeve 13. An assembly including such elements 40 is shown in FIG. 4.

Figure 2:
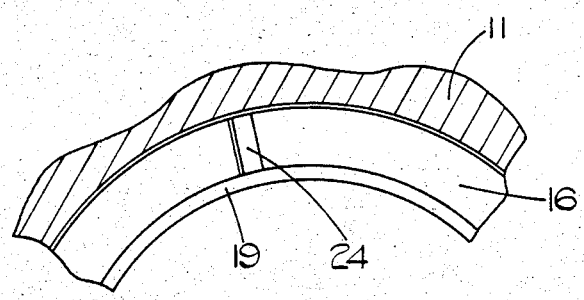
FIG. 2 is a part section on line 2—2 in FIG. 1.
Figure 3:
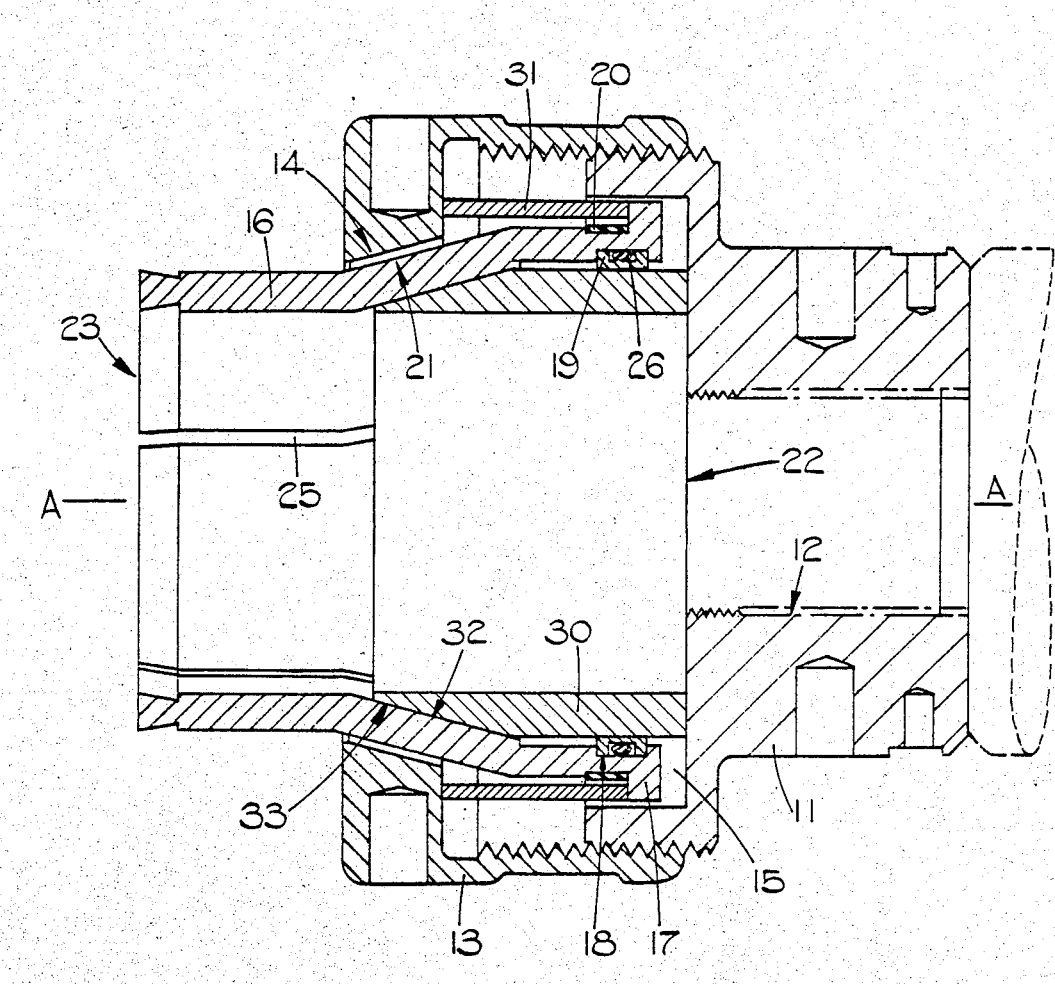
FIG. 3 shows the chuck of FIG. 1 adapted for gripping an inside surface of a workpiece.

The arrangment also permits the collet to be reassembled readily into the configuration shown in FIG. 3, in which rightward movement of the sleeve 13 urges the ends 23 radially outwards, to grip the inside surface of a workpiece. The arrangment shown in FIG. 3 corresponds to that of FIGS. 1 and 2, but with the addition of an inner sleeve 30 which abuts the bottom 22 of the recess 15. Also provided is a cylindrical spacer 31 which engages a face of the sleeve 13 and opposed faces of the flanges 17 and maintains a radial clearance between the faces 14, 21. The sleeve 30 has a frusto-conical face 32 which in the present example has an included angle equal to that of the faces 14, 21. It is not, however, necessary that this should be so, and the face 32 may have some other included angle. Concave inner faces 33 of the elements 16 lie on a conical surface whose included angle is equal to that of the face 32.

In this configuration rightward movement of the sleeve 13 initially tends to pivot the elements 16 about the ring 19 and to open the ends 23. Subsequently, engagement between the faces 32, 33, urges the ends 23 radially outwards within the clearance between the faces 14, 21. As before, the collet may readily be dismantled for substitution of elements 16 of a different size, including those whose ends 23 define diameters which are larger than that of the opening in the sleeve 13.

The toroidal ring 26 takes up any play between the ring 19 and the grooves 18 in the elements 16, and prevents sloppiness in movement of the elements 16 without the necessity of providing close tolerances on the parts.

Conveniently the body 11 and sleeve 13 are provided with respective tool-receiving recesses 35, 36 to facilitate their being tightened into threaded engagement with their co-operating parts. Preferably also the body 11 is provided with a plurality of equi-angularly spaced indexing holes 37 for receiving a relatively fixed indexing pin on an associated machine tool, so that the chuck may be maintained in a required rotational position relative to the machine tool.

It is to be understood that in alternative embodiments the faces 14, 21, 32, 33 need not lie on conical surfaces but may have other configurations, for example such as to show curved generating lines in the sections of FIG. 1, 2 and 4.

I claim:

1. A Collet chuck comprising a body having means for securing to a machine tool shaft so that the axis of said body is aligned with that of said shaft, a plurality of jaws mounted in said body, an outer sleeve surrounding said jaws and being axially movable relative to said body, said jaws being separate arcuate elements, and positioning means axially movable with said jaws for maintaining the latter in relative axial alignment and circumferential spacing, each of said jaws having an outer face and an abutment which latter can coact with a spacer which can engage said outer sleeve to prevent engagement thereof with the outer faces of said jaws, said jaws also having inner faces inclined to said axis of the body which can engage with an inner sleeve as a result of coaction between said abutments and said spacer, whereby in the absence of said spacer and inner sleeve and axial movement of said outer sleeve results in engagement of said outer sleeve with the outer faces of said jaws to urge said jaws radially inwardly, and in the presence of said spacer an inner sleeve the same axial movement of said outer sleeve results in engagement of said inner sleeve with the inner faces of said jaws to urge said jaws radially outwardly.

2. A collet chuck as claimed in claim 1 which includes a spacer engage between the abutment on said jaws and said outer sleeve, for preventing engagement between said outer sleeve and said outer faces of said jaws, and an inner sleeve located with respect to said body and engaged by said inner faces of said jaws.

3. A collet chuck as claimed in claim 1 in which said outer faces of said jaws lie on a conical surface which is coaxial with said body, and said outer sleeve surface is frusto-conical and has an included angle substantially equal to that of said conical surface.

4. A collet chuck as claimed in claim 1 in which said inner faces of said jaws lie on a conical surface which is coaxial with said body, and said inner sleeve surface is frusto-conical and has an included angle substantially equal to that of said conical surface.

5. A collet chuck as claimed in claim 1 which includes a rigid ring on which said positioning means inner surfaces of said jaws are located, and an expandable outer ring for urging said jaws inwardly towards engagement with said rigid ring.

6. A collet chuck as claimed in claim 5 in which said expandable ring is elastomeric.

7. A collet chuck as claimed in claim 1 in which both ends of said jaws define diameters which are larger than the smallest internal diameter of said outer sleeve.

* * * * *